United States Patent [19]

Tagami

[11] 4,215,726
[45] Aug. 5, 1980

[54] PROTECTIVE UNIT FOR WATER PIPES AND A METHOD FOR SETTING THE UNIT

[76] Inventor: Masahiro Tagami, 6-94 Unuma, Ngamihara-shi, Gifu-ken, Japan

[21] Appl. No.: 934,507

[22] Filed: Aug. 17, 1978

[30] Foreign Application Priority Data

Aug. 23, 1977 [JP] Japan ............................ 52-101851

[51] Int. Cl.² .............................................. E03B 7/10
[52] U.S. Cl. ......................................... 138/30; 138/28
[58] Field of Search ..................... 138/28, 30, 27, 26

[56] References Cited

U.S. PATENT DOCUMENTS

| | | | |
|---|---|---|---|
| 435,927 | 9/1890 | Ginty ........................................ | 138/28 |
| 3,091,258 | 5/1963 | Marette ..................................... | 138/30 |
| 3,415,277 | 12/1968 | Mitchell et al. ......................... | 138/30 |
| 3,536,102 | 10/1970 | Allewitz et al. ......................... | 138/30 |
| 3,766,992 | 10/1973 | Tiraspolsky et al. ................... | 138/30 |
| 3,878,867 | 4/1975 | Dirks ........................................ | 138/30 |

*Primary Examiner*—Lenard A. Footland
*Attorney, Agent, or Firm*—Koda and Androlia

[57] ABSTRACT

A protective unit for water pipes comprising an expansible cylindrical member having pleats, a cylindrical cover having pleats, a cylindrical cover having ventilations therethrough and such a size as to cover the whole cylindrical member, and a metallic cap having two grooves to engage with the cylindrical member and the cap. The expansible cylindrical member, particularly the pleats will absorb any expansion of freezing water in the water pipes to prevent the pipes from having cracks. The cap firmly holds the end portions of the cylindrical member thereby securing an excellent contact therebetween.

5 Claims, 3 Drawing Figures

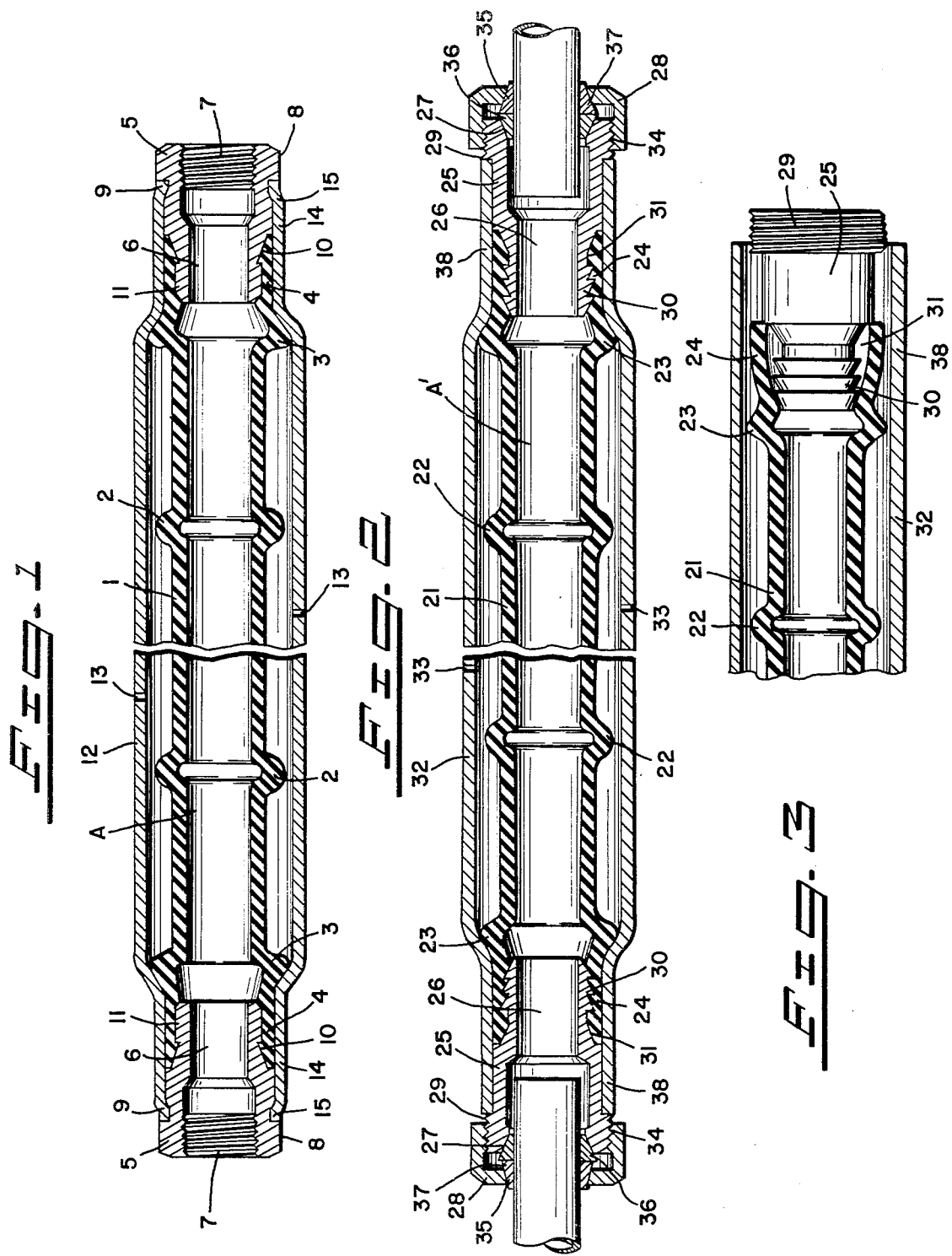

PROTECTIVE UNIT FOR WATER PIPES AND A METHOD FOR SETTING THE UNIT

BACKGROUND OF THE INVENTION

1. Field of the Invention

This invention relates to a protective unit for water pipes and a method for setting such unit upon water pipes.

2. Prior Art

It is not unlikely under cold weather that water pipes and faucets have cracks and valve seats are damaged by expansion of freezing water. When temperature rises in the morning, water will spout through those cracks. A considerable amount of work and time has to be spent to repair those damages in the pipes.

A number of devices have been proposed as a solution to the problem. However, none of them has successfully overcome the breakage problem. The common difficulty is that those devices may absorb the expansion of water but fail to keep precise contact and start to leak after some time.

This invention has been developed to eliminate those shortcomings of the prior art water pipe by attaching to water pipes protection unit with a particular consideration on its buffer member.

SUMMARY OF THE INVENTION

Accordingly, it is the primary object of this invention to provide a protective unit for water pipes to prevent cracks in the pipes by freezing water.

It is another object of this invention to provide a method for setting such unit upon water pipes.

BRIEF DESCRIPTION OF THE DRAWINGS

FIG. 1 shows a cross-section view of an embodiment of a protective unit of this invention.

FIG. 2 shows a cross-section view of another embodiment of this invention.

FIG. 3 shows a cross-section view of a part of the embodiment shown in FIG. 2 to illustrate the process of setting the unit.

DETAILED DESCRIPTION OF THE INVENTION

First referring to FIG. 1, numeral 1 designates an expansible cylindrical member made of an elastic material and equipped with a plurality of annular pleats 2 around the member 1. The cylindrical member 2 also includes outwardly projected shoulders 3 and coupling ports 4 at its both ends. Numeral 5 designates metallic cap having a water passage 6 and a threaded opening joint 7 at its outer end. The cap 5 also has a polygonal head 8, an outer groove 9 and inner grove 10 in its periphery.

Numeral 12 designates cylindrical cover which covers the whole expansible cylindrical member 1. The cover 12 is provided with ventilations 13. To form the unit of this invention, the caps 5 are inserted into the cylindrical member 1 at both ends thereof such that the inner groove 10 of the cap 5 will firmly engage with sword guard-like projections 11 of the cylindrical member 1. Then, the cylindrical member 1 with the caps 5 is inserted into the cylindrical cover 12 and the end portions 14 are pressed to closely hold the coupling ports 4 of the cylindrical member 1 and the caps 5, wherein the edges 15 of the cylindrical cover are to fit in the outer grooves 9 to prevent the caps 5 from falling off.

The following is the explanation of the function and effect of this embodiment. When a protective unit A is connected to an appropriate spot of a water pipe through the threaded opening joints 7 of the caps 5, the expansion of freezing water will give a pressure to the inner surface of the expansible cylindrical member 1. Such pressure will be mostly absorbed in the transformation of the pleats 2. While the pleats 2 are transformed to absorb the pressure, both end portions thereof are pulled inwardly. The coupling ports 4 thereby receive a tension and would cause contraction or transformation inwardly. However, the sword guard like projection 11 firmly engage with the grooves 10 of the caps 5 and is closely covered with the cylindrical cover 12, the coupling ports 4 will not be contracted inwardly thereby keeping a close contact in the coupling ports 4. When the water temperature rises, the pressure by the water will drop and the transformed expansible cylindrical member, particularly the pleats 2 thereof, will return to its original position. Thus, the protective unit A will prevent the water pipes from cracking because of freezing water without causing irregular restoration on the coupling ports 4 or the cylindrical member 1. This will allow the protective unit to have an excellent durability.

Now referring to FIG. 2 where another embodiment of this invention is shown, numeral 21 designates an expansible cylindrical member made of an elastic material and provided with pleats 22. The cylindrical member 21 has outwardly projected shoulders 23 at both ends thereof and coupling ports 24. Numeral 25 designates a metallic cap having a water passage 26 therethrough, skirts 27, and threaded joints 29 for a connection with a fastening nut 28. The cap 25 also has a saw-toothed annular projections 30 to engage with counter toothed projection 31 provided inside of the cylindrical member 21. Numeral 32 designates a cylindrical cover which has such a size as to protect the whole cylindrical member 21. The cover 32 has ventilations 33 therein. The fastening nut 28 has at one end a screwed opening 34 therethrough which will engage with the threaded joint 29 of the cap 25 and also has a narrowed opening 35 at the other end thereof. Numeral 36 designates a tapered annular seal; 37 designates a fastening taper ring. The cylindrical member 21 and the cover 32 are installed onto the metallic cap 25 in the same manner as the first embodiment. The function of the protective unit A' of this second embodiment is basically the same as the first embodiment.

Finally, referring to FIG. 3, which shows a part of the protective unit A' of the second embodiment, the following is the explanation on the method of setting the unit A'.

First, the coupling ports 24 of the cylindrical member 21 are to be put around the saw-toothed annular projections 30 of the cap 25 so that the cylindrical member 21 engage with the cap 25. The cylindrical cover 32 is installed over the cylindrical member 21 and pressed at its ends whereby the cover 32 will closely hold the cylindrical member 21 with its tapered ends 38. By doing so, the saw-tooth projections 30 will firmly engage with the counter projections 31 of the elastic cylindrical member 21 to form strong water-tightness between the cylindrical member 21 and the metallic cap 25. After a water pipe 39 is inserted into the skirts 27 of the cap 25, the tapered annular seal 36 and the fastening tapered ring 37 are put around the pipe 39. Then the fastening nut 28 is screwed onto the threaded joints 29 to secure the connection between the pipe 29 and the protective unit A' thorugh the cap 25. Thus, the protective unit A' of this invention will absorb the expansion of the water in the water pipes with the expansible cylindrical member, particularly in the pleats, without loosening the connection between the water pipe and the protective unit itself.

I claim:

1. A protective unit for water pipes comprising:
   an expansible cylindrical member having at least one pleats and sword guard-like projections near the ends;
   a cylindrical cover having at least one ventilations therein and having such a size as to cover the whole cylindrical member and such a configuration at its both ends as to closely hold the end portions of the cylindrical member; and
   a metallic cap having a groove to firmly engage with said sword guard-like projections of the end portion of said cylindrical member and another groove to engage with the end portion of said cover.

2. A protective unit for water pipes according to claim 1, wherein the cap has a threaded opening at its outer end.

3. A protective unit for water pipes according to claim 1, wherein the cylindrical member has an outwardly projected shoulders at its both ends.

4. A protective unit for water pipes comprising:
   an expansible cylindrical member having at least one pleats;
   a cylindrical cover having at least one ventilations therein and having such a size as to cover the whole cylindrical member and such a configuration at its both ends as to closely hold the end portions of the cylindrical member;
   a metallic cap having a groove to engage with the end portion of said cylindrical member and another groove to engage with the end portion of said cover; and
   a fastening nut with a threaded opening at one end and a narrowed opening at the other end, said nut being put around the cap, an annular seal and a fastening tapered ring to be disposed between said nut and a water pipe.

5. A protective unit for water pipes according to claim 4, wherein the cap has saw-tooth projections to engage with the end portion of the cylindrical member.

* * * * *